(12) United States Patent
Eliahou-Niv et al.

(10) Patent No.: US 6,247,670 B1
(45) Date of Patent: Jun. 19, 2001

(54) ACTIVE FLAPERON ASSEMBLY

(75) Inventors: Shaul Eliahou-Niv, Ramat Gan; Israel Wygnanski, Tel Aviv, both of (IL)

(73) Assignee: Ramot University Authority for Applied Research and Industrial Development Ltd, Tel Aviv (IL)

( * ) Notice: Subject to any disclaimer, the term of this patent is extended or adjusted under 35 U.S.C. 154(b) by 0 days.

(21) Appl. No.: 09/391,609

(22) Filed: Sep. 7, 1999

(51) Int. Cl.⁷ .............................. B64C 21/00; B64C 9/22; B64C 3/58; B64C 3/50
(52) U.S. Cl. ..................... 244/204; 244/213; 244/212; 244/215
(58) Field of Search .................... 244/204, 213, 244/215, 201, 212, 199

(56) References Cited

U.S. PATENT DOCUMENTS

| | | | |
|---|---|---|---|
| 2,329,177 | * 9/1943 | Baker | 244/213 |
| 2,549,760 | * 4/1951 | Adams | 244/213 |
| 2,635,837 | * 4/1953 | Grant | 244/213 |
| 3,281,095 | * 10/1966 | Runge | 244/204 |
| 3,677,504 | * 7/1972 | Schwarzler | 244/212 |
| 4,015,787 | * 4/1977 | Maielli et al. | 244/215 |
| 4,120,470 | * 10/1978 | Whitener | 244/213 |
| 4,845,357 | * 7/1989 | Brennan | 250/227.14 |
| 5,096,144 | * 3/1992 | Fishwick | 244/110 D |
| 5,209,438 | 5/1993 | Wygnanski | 244/203 |
| 5,545,007 | * 8/1996 | Martin | 415/173.2 |
| 5,570,859 | * 11/1996 | Quandt | 244/213 |
| 5,626,312 | * 5/1997 | Head | 244/75 R |
| 5,697,468 | * 12/1997 | Russel, Jr. et al. | 180/116 |
| 5,983,944 | 11/1999 | Niv | 244/206 |
| 6,105,421 | * 8/2000 | Yao et al. | 73/105 |
| 6,123,296 | * 9/2000 | Mangalam | 244/204 |

* cited by examiner

Primary Examiner—Charles T. Jordan
Assistant Examiner—Christian M. Best
(74) Attorney, Agent, or Firm—Mark M. Friedman

(57) ABSTRACT

An active flaperon assembly for a wing includes a sheet of flexible material deployed near an intersection between a primary lift surface of a wing and the surface of a flap. The sheet is mechanically linked to the flap such that it is withdrawn from and extended into the air flow over the wing, the extent of projection varying as a function of the downward deflection of the flap. An actuator generates mechanical oscillations in the sheet.

13 Claims, 4 Drawing Sheets

ACTIVE FLAPERON ASSEMBLY

FIELD AND BACKGROUND OF THE INVENTION

The present invention relates to devices for introducing perturbations into a flow field near a wing surface or other surface and, in particular, it concerns an active flaperon assembly for delaying or controlling boundary layer separation.

It has been found that mechanical energy (momentum) supplied in the form of perturbations of certain frequencies to the air flow passing over a wing helps to delay boundary layer separation from the surface of the wing, thereby increasing the lift, decreasing drag or otherwise improving the performance which can be obtained from the wing. This principle and various structures for implementing it are described in U.S. Pat. No. 5,209,438 to one of the co-inventors of the present invention. The aforementioned patent is hereby incorporated by reference as if fully set out herein.

While the principle described in the aforementioned patent has been demonstrated to be effective, to the best of the inventors' knowledge, no application of the principle has yet been widely implemented. This may be due to concerns as to the effect of the required wing modifications during normal flight when the perturbations are not required. While the aforementioned patent describes, on a highly schematic level, a number of possible structures for introducing the required perturbations, all of the structures modify existing wing designs to some extent and alter the basic wing profile.

Reference is also made to an unpublished U.S. patent application Ser. No. 09/045,220 to the other co-inventor of the present invention. This application addresses various piezoelectric materials and associated configurations suitable for generating perturbations in the air flow.

There is therefore a need for an active system for generating perturbations in the air flow over a wing which would require little or no modification of a conventional wing structure and which would not affect the air flow when not in use.

SUMMARY OF THE INVENTION

The present invention is an active flaperon assembly for a wing.

According to the teachings of the present invention there is provided, an active flaperon assembly for a wing, the wing including: (a) a main wing portion providing at least one primary lift surface; and (b) a flap hingedly attached to the main wing portion such that the flap can be deployed between a normal position in which the flap provides a flap surface which is substantially a continuation of the primary lift surface and a downwardly deflected position in which the flap surface is inclined downwards relative to the primary lift surface, the active flaperon assembly comprising: (i) a sheet of flexible material deployed near an intersection between the primary lift surface and the flap surface, the sheet being mechanically linked to the flap such that, when the flap assumes the normal position, the sheet is substantially withdrawn from the air flow across the primary lift surface and the flap surface, and when the flap is deflected downwards, the sheet projects into the air flow across the primary lift surface and the flap surface, an extent of projection of the sheet varying as a function of an extent of downward deflection of the flap, and (ii) an actuator associated with the sheet for generating mechanical oscillations in the sheet.

According to a further feature of the present invention, the sheet is mechanically linked to the flap such that at least a part of the sheet moves in an arcuate movement in step with, and about a common axis with, hinged motion of the flap relative to the main wing portion.

According to a further feature of the present invention, the main wing portion has a lower surface, the common axis being substantially at the lower surface.

According to a further feature of the present invention, the main wing portion has a lower surface, the common axis being at a position substantially medial between the primary lift surface and the lower surface.

According to a further feature of the present invention, when the flap assumes the normal position, the sheet assumes a generally curved configuration interposed between the main wing portion and the flap and, when the flap is deflected downwards, a part of the sheet projecting into the air flow is substantially flat.

According to a further feature of the present invention, the sheet is made from metallic material.

According to a further feature of the present invention, the actuator includes piezoelectric material.

According to a further feature of the present invention, the piezoelectric material forms part of a mechanical linkage between the sheet and the flap.

There is also provided, according to the teachings of the present invention, an active flaperon assembly for controlling a fluid flow field near a surface of a body, the active flaperon assembly comprising: (a) at least one rotatable element rotatably mounted relative to the surface about an axis of rotation, the rotatable element having at least one attachment surface located mainly within the body; (b) an elongated opening in the surface adjacent to the rotatable element; (c) a sheet of flexible material deployed within the elongated opening, the sheet being mechanically linked to the at least one attachment surface such that, when the rotatable element is rotated to a first position, the sheet is substantially withdrawn from the fluid flow near the surface, and when the rotatable element is rotated to a second position, the sheet projects into the fluid flow near the surface; and (d) an actuator associated with the sheet for generating mechanical oscillations in the sheet.

According to a further feature of the present invention, the body is a wing, the rotatable element is a flap and the elongated opening is a gap between the flap and a main portion of the wing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an active flaperon assembly for controlling fluid flow over a wing or other surface.

The principles and operation of active flaperon assemblies according to the present invention may be better understood with reference to the drawings and the accompanying description.

Before turning to the drawings, it should be noted that the term "flaperon" is used herein in the description and claims to refer to a selectively-deployable flow-control surface which is associated with a primary surface over which a fluid flows. The primary surface may be a surface of a wing, a diffuser, or any other flat or curved surface over which fluid flow is to be controlled. The fluid may be air, water or any other fluid. For conciseness of presentation, the invention will be described below in the context of non-limiting but preferred examples of a wing passing through air.

Figure 1:
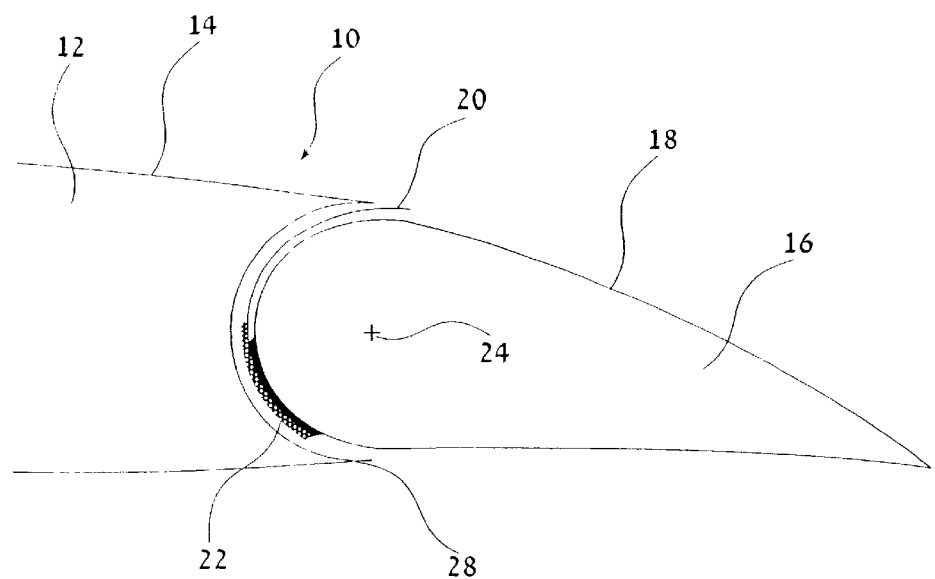
FIG. 1 is a side cross-sectional view taken through a wing including a flap fitted with an active flaperon assembly, constructed and operative according to the teachings of the present invention.
Figure 2:
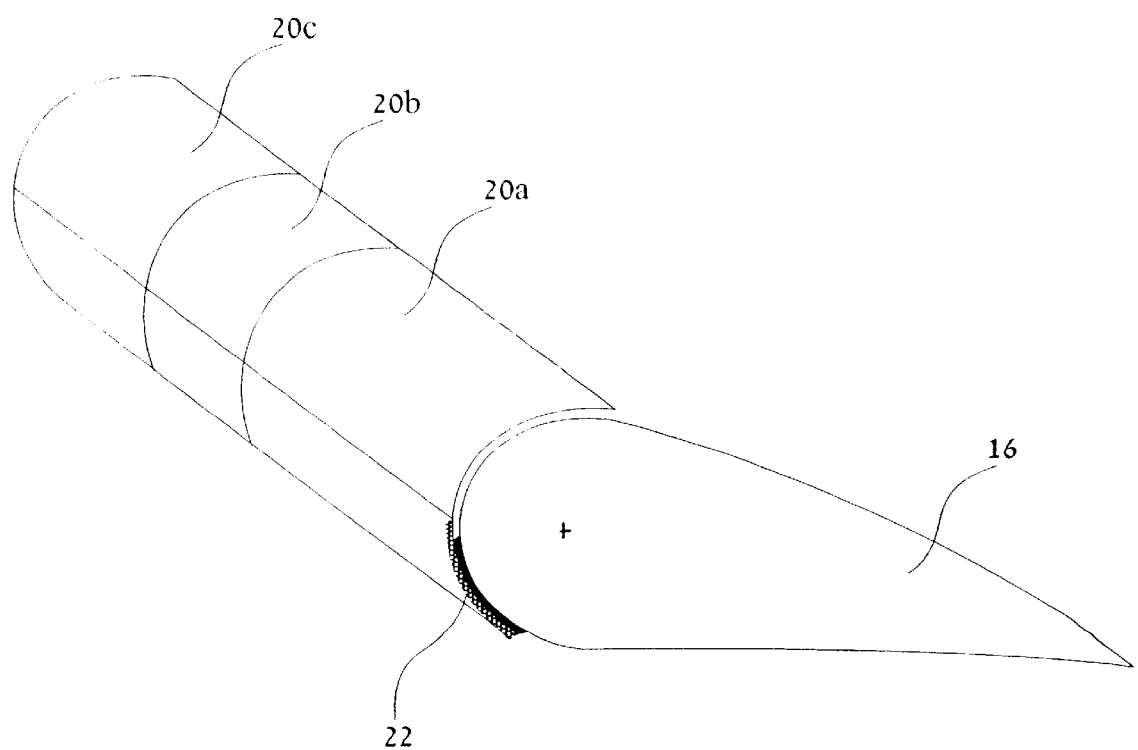
FIG. 2 is a partially cut-away, isometric view of the wing of FIG. 1.
Figure 3A:
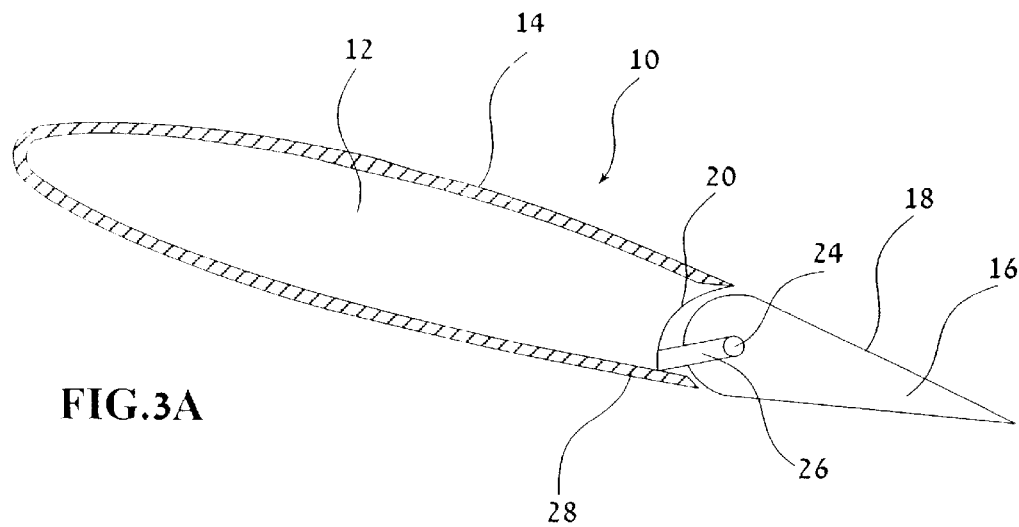
FIGS. 3A–3C are side cross-sectional views of a wing showing a first variant of the active flaperon assembly of FIG. 1 with three degrees of downward deflection of the flap.
Figure 3B:
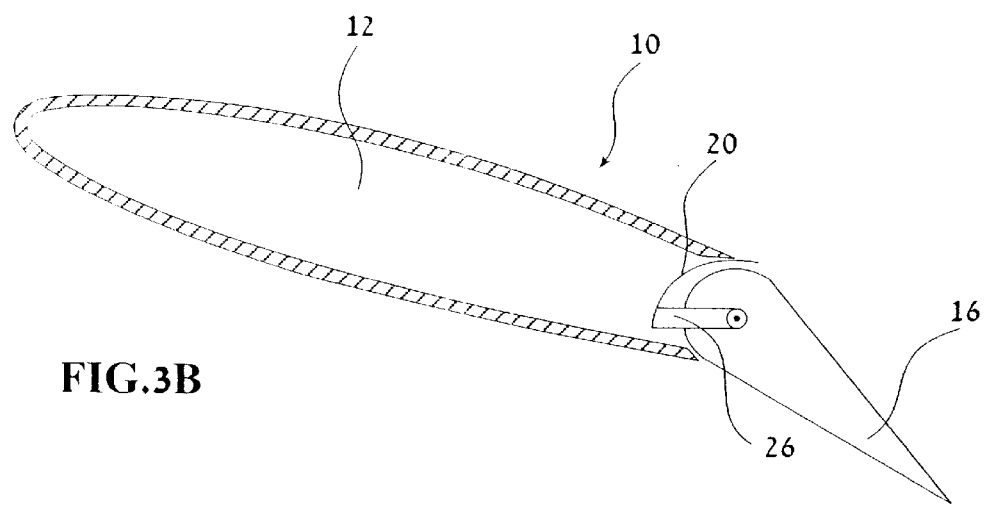
Figure 3C:
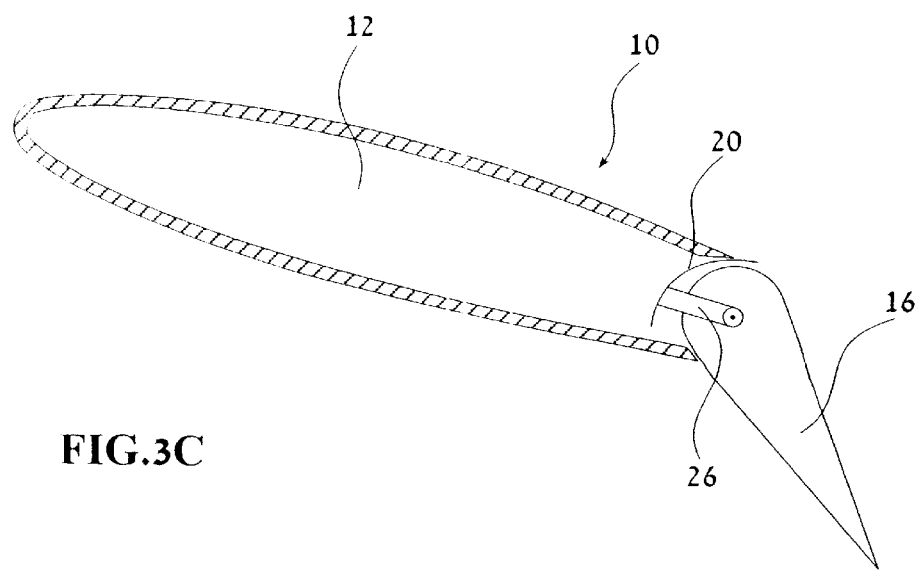

Referring now to the drawings, FIGS. 1 and 2 show a wing fitted with an active flaperon assembly 10, constructed and operative according to the teachings of the present invention.

According to one particularly preferred set of embodiments of the present invention, active flaperon assembly 10 may be fitted on a conventional wing which has a flap without requiring any modification of the structure of the wing itself. Thus, the wing shown here has a main wing portion 12 providing at least one primary lift surface 14, and a flap 16 hingedly attached to main wing portion 12. Flap 16 is hinged in a conventional manner to be deployable between a normal position in which flap 16 provides a flap surface 18 which is substantially a continuation of primary lift surface 14 and at least a downwardly deflected position in which flap surface 18 is inclined downwards relative to primary lift surface 14.

According to the particularly preferred set of embodiments, active flaperon assembly 10 is then implemented by deploying a sheet 20 of flexible material near the intersection between primary lift surface 14 and flap surface 18. Sheet 20 is mechanically linked to flap 16 such that, when flap 16 assumes its normal position, sheet 20 is substantially withdrawn from the air flow across primary lift surface 14 and flap surface 18, and when flap 16 is deflected downwards, sheet 20 projects into the air flow. The extent of projection of sheet 20 varies as a function of the extent of downward deflection of flap 16. An actuator 22, associated with sheet 20, is configured to generate mechanical oscillations in sheet 20.

It will be immediately apparent that the present invention provides a highly practical and advantageous implementation of the principle of active fluid flow control proposed in U.S. Pat. No. 5,209,438 mentioned above. Firstly, the active flaperon assembly requires no modification of the basic wing structure and is readily retrofittable. Secondly, whenever the flap is in its non-deflected position, sheet 20 is substantially withdrawn. This ensures that the aerodynamic properties of the wing are unaffected by the presence of the active flaperon assembly. At the same time, the withdrawn position provides protection to the flaperon assembly from adverse environmental conditions and potential causes of mechanical wear or damage.

Turning now to the features of active flaperon 10 in more detail, sheet 20 may be made from a wide range of materials suitable for transferring oscillatory mechanical energy to the air flow. A preferred example is the use of a metal or metal alloy, referred to collectively as a metallic material. Other examples of suitable materials include, but are not limited to, various polymer materials, composite materials, materials based on carbon fibers, shape-memory alloys and "smart materials". The dimensions of the material are chosen according to the application to provide a natural frequency of vibrations in a desired range, preferably optimized for the typical conditions under which the flaperon will be operated for the wing in question. Optionally, "smart materials" (materials for which the mechanical properties may be modified electrically) may be used to provide control over the frequency of vibrations.

Actuator 22 preferably includes piezoelectric material. Examples of suitable piezoelectric materials include, but are not limited to, piezoelectric ceramics such as lead zirconate titanate (PZT), lead magnesium niobate (PMN) and barium titanate. As shown in FIGS. 1 and 2, the piezoelectric material 22 preferably forms part of the mechanical linkage between sheet 20 and flap 16, rendering the entire structure extremely simple to implement.

Sheet 20 is preferably mechanically linked to flap 16 such that at least a part of the sheet moves in an arcuate movement in step with, and about a common axis 24 with, the hinged motion of flap 16 relative to main wing portion 12. This avoids the need for any additional deployment mechanism and ensures that the degree of deployment is always in step with the flap usage. The linkage of sheet 20 to flap 16 may be achieved by connecting it directly or through actuator 22 to the hidden convex leading edge of the flap as shown in FIGS. 1, 2 and 4A–4C. Alternatively, in order to increase the radial distance from axis 24 and hence the extent of projection of sheet 20 in its deployed state, projecting arms 26 may be interposed between flap 16 and sheet 20 as shown in FIGS. 3A–3D.

Figure 4A:
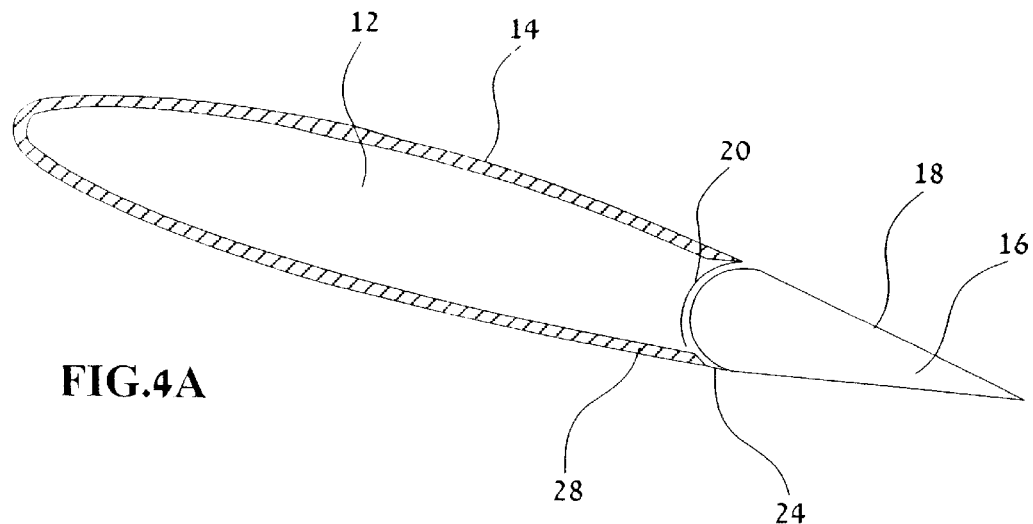
FIGS. 4A–4C are side cross-sectional views of a wing showing a second variant of the active flaperon assembly of FIG. 1 with three degrees of downward deflection of the flap.
Figure 4B:
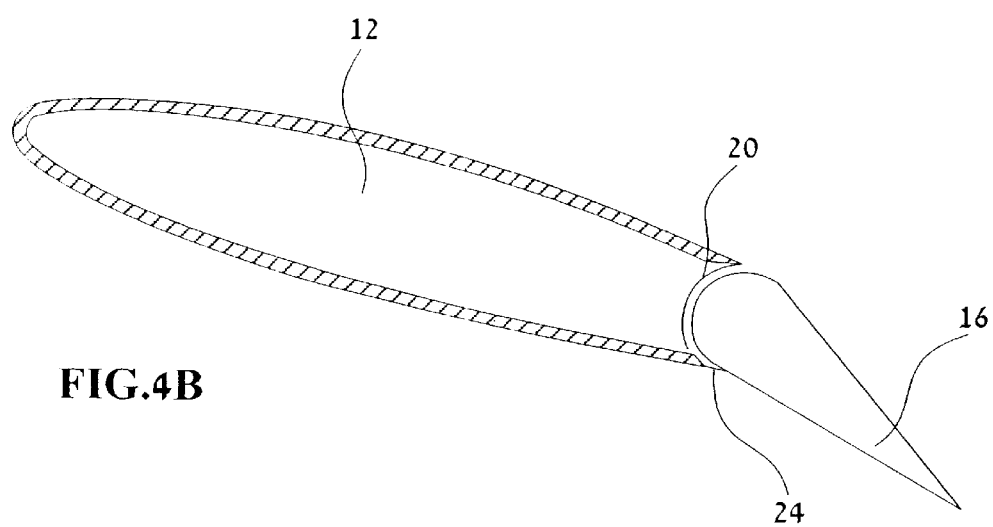
Figure 4C:
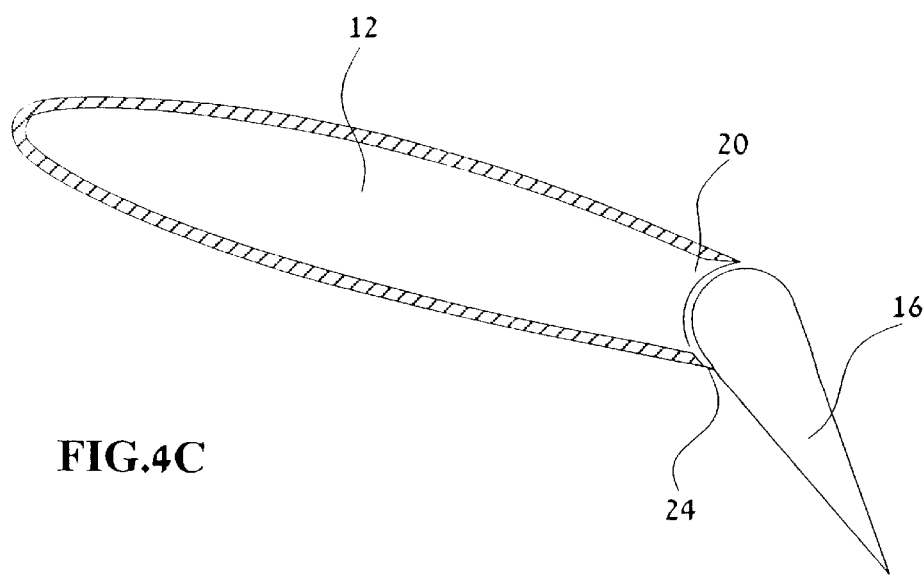

It should be noted that the invention is equally applicable to many wing designs. By way of example, FIGS. 1–3C illustrate applications to a wing with a centrally-hinged flap, i.e., a wing in which axis 24 is located in a substantially medial position between primary lift surface 14 and a lower surface 28 of the wing. FIGS. 4A–4C, on the other hand, illustrate an application of the invention to a wing with a bottom-hinged flap, i.e., a wing in which axis 24 is located substantially at lower surface 28.

As mentioned above, sheet 20 is made from flexible material engineered to have an appropriate frequency of oscillation. Actuator 22 is preferably actuated at, or close to, this frequency. The spacing between main wing portion 12 and flap 16 is preferably sufficiently big that it does not act as a stop to change the frequency of oscillation of sheet 20 but merely as an attenuator, reducing the amplitude in proportion to the extent to which sheet 20 is withdrawn.

With specific reference to FIG. 2, it should be appreciated that the present invention is not limited to wings with a constant profile along their length. Firstly, a single sheet 20 may be made to vary its dimensions along the length of a wing in order to provide the degree of perturbation required at each point. Alternatively, a number of independent segments, labeled here 20a, 20b and 20c may be provided, each corresponding to a different section of the wing, either with common or independent flaps. Each segment may be designed and operated with its own particular frequency, and the segments may be operated selectively if desired.

It will be noted that the present invention provides particularly compact and convenient storage for sheet 20 when not in use. Thus, when the flap is in its normal position, sheet 20 assumes a generally curved configuration interposed in the inherent slot which exists between the main wing portion and the flap. When the flap is deflected downwards, the part of sheet 20 projecting into the air flow returns, typically under its own elastic memory, to what may be referred to as a substantially flat configuration, notwithstanding some degree of deflection which may be caused by the force of the fluid flow.

Figure 5:
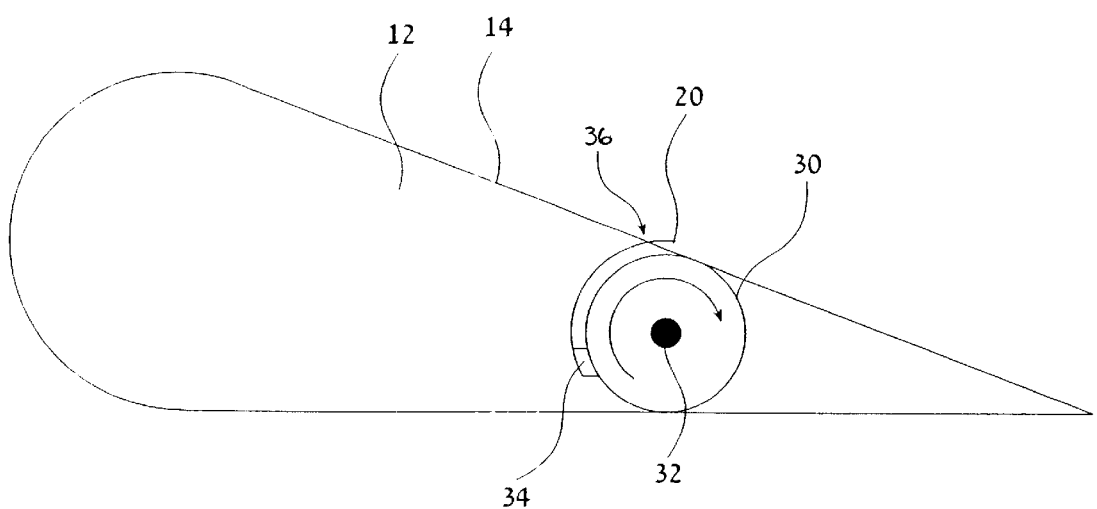
FIG. 5 is a side cross-sectional view taken through a wing fitted with an alternative embodiment of an active flaperon assembly.

Referring now briefly to FIG. 5, it should be noted that the present invention is not limited to applications linked to the flap of a wing. Thus, FIG. 5 shows an alternative embodiment in which at least one rotatable element 30 is rotatably mounted relative to the wing about an axis of rotation 32. Rotatable element 30 has at least one attachment surface 34 located mainly within the wing. An elongated opening 36 is provided in the surface of the wing adjacent to rotatable element 30. The remaining features of the assembly are then fully analogous to those of assembly 10 described above.

This embodiment may be implemented at any position on a wing, including adjacent to the leading edge, and may be used in addition to the embodiment of FIGS. 1 and 2. Furthermore, this embodiment clearly lends itself to applications for primary surfaces other than wings, such as in diffusers.

It will be noted that, in the case that rotatable element 30 is a flap and elongated opening 36 is the gap between the flap and the main portion of the wing, this embodiment becomes identical to assembly 10 described above.

It will be appreciated that the above descriptions are intended only to serve as examples, and that many other embodiments are possible within the spirit and the scope of the present invention.

What is claimed is:

1. An active flaperon assembly for a wing, the wing including:
   (a) a main wing portion providing at least one primary lift surface; and
   (b) a flap hingedly attached to said main wing portion such that said flap can be deployed between a normal position in which said flap provides a flap surface which is substantially a continuation of said primary lift surface and a downwardly deflected position in which said flap surface is inclined downwards relative to said primary lift surface,
   the active flaperon assembly comprising:
   (i) a sheet of flexible material deployed near an intersection between said primary lift surface and said flap surface, said sheet being mechanically linked to said flap such that, when said flap assumes said normal position, said sheet is substantially withdrawn from the air flow across said primary lift surface and said flap surface, and when said flap is deflected downwards, said sheet projects into the air flow across said primary lift surface and said flap surface, an extent of projection of said sheet varying as a function of an extent of downward deflection of said flap, and
   (ii) an actuator associated with said sheet and configured to generate periodic mechanical oscillations in said sheet.

2. The active flaperon assembly of claim 1, wherein said sheet is mechanically linked to said flap such that at least a part of said sheet moves in an arcuate movement in step with, and about a common axis with, hinged motion of said flap relative to said main wing portion.

3. The active flaperon assembly of claim 2, wherein said main wing portion has a lower surface, said common axis being substantially at said lower surface.

4. The active flaperon assembly of claim 2, wherein said main wing portion has a lower surface, said common axis being at a position substantially medial between said primary lift surface and said lower surface.

5. The active flaperon assembly of claim 2, wherein, when said flap assumes said normal position, said sheet assumes a generally curved configuration interposed between said main wing portion and said flap and, when said flap is deflected downwards, a part of said sheet projecting into the air flow is substantially flat.

6. The active flaperon assembly of claim 1, wherein said sheet is made from metallic material.

7. The active flaperon assembly of claim 1, wherein said actuator includes piezoelectric material.

8. The active flaperon assembly of claim 7, wherein said piezoelectric material forms part of a mechanical linkage between said sheet and said flap.

9. The active flaperon assembly of claim 1, wherein said flap is hingedly attached to said main wing portion at a hinge such that said flap is limited to rotational motion about an axis which is fixed in relation to said main wing portion.

10. The active flaperon assembly of claim 1, wherein, when said flap is deflected downwards, a free edge of said sheet projects into the air flow across said primary lift surface and said flap surface.

11. The active flaperon assembly of claim 1, wherein said actuator is deployed to generate said mechanical oscillations without varying said extent of projection of said sheet.

12. An active flaperon assembly for controlling a fluid flow field near a surface of a body, the active flaperon assembly comprising:
   (a) at least one rotatable element rotatably mounted relative to the surface about an axis of rotation, said rotatable element having at least one attachment surface located mainly within the body;
   (b) an elongated opening in the surface adjacent to said rotatable element;
   (c) a sheet of flexible material deployed within said elongated opening, said sheet being mechanically linked to said at least one attachment surface such that, when said rotatable element is rotated to a first position, said sheet is substantially withdrawn from the fluid flow near the surface, and when said rotatable element is rotated to a second position, said sheet projects into the fluid flow near the surface; and
   (d) an actuator associated with said sheet and configured to generate periodic mechanical oscillations in said sheet.

13. The active flaperon assembly of claim 12, wherein the body is a wing, said rotatable element is a flap and said elongated opening is a gap between said flap and a main portion of the wing.

* * * * *